US012608154B2

(12) United States Patent
Chandra et al.

(10) Patent No.: US 12,608,154 B2
(45) Date of Patent: Apr. 21, 2026

(54) OVERCOMING SATURATED PORTS IN DISTRIBUTED DATA STORAGE SYSTEMS

(71) Applicant: International Business Machines Corporation, Armonk, NY (US)

(72) Inventors: Anuj Chandra, Bengaluru (IN); Imran Imtiaz, Manchester (GB); Graham Woodward, Manchester (GB); Miles Mulholland, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 18/582,414

(22) Filed: Feb. 20, 2024

(65) Prior Publication Data

US 2025/0265007 A1     Aug. 21, 2025

(51) Int. Cl.
*G06F 15/16* (2006.01)
*G06F 3/06* (2006.01)

(52) U.S. Cl.
CPC ............ *G06F 3/0655* (2013.01); *G06F 3/061* (2013.01); *G06F 3/067* (2013.01)

(58) Field of Classification Search
CPC ........ G06F 3/0655; G06F 3/061; G06F 3/067; G06F 3/0635
See application file for complete search history.

(56) References Cited

U.S. PATENT DOCUMENTS 7,467,191 B1 * 12/2008 Wang ..................... G06F 11/20
714/4.11
8,055,745 B2 * 11/2011 Atluri ................. G06F 11/1469
709/217

8,626,967 B1 * 1/2014 Naik ..................... G06F 3/0662
710/31
9,537,743 B2 * 1/2017 Deshpande ......... H04L 41/0896
9,747,180 B1 * 8/2017 Fair ..................... G06F 11/2005
9,852,034 B2 12/2017 Akirav et al.
9,983,812 B1 * 5/2018 Don ..................... G06F 11/2094
10,613,946 B2 * 4/2020 Compton ............ G06F 11/2094
11,947,805 B2 * 4/2024 Sahin ..................... G06F 3/061
2005/0021751 A1 * 1/2005 Block ................. H04L 67/1017
714/E11.073

(Continued)

OTHER PUBLICATIONS

Anonymous, "Method for Handling Bandwidth Overloading in Swap Nodes and Masking Intra-Tier Data Migration with Improved Application Performance," IP.com Prior Art Database, Technical Disclosure No. IPCOM000265455D, Apr. 12, 2021, 8 pages.

*Primary Examiner* — Razu A Miah
(74) *Attorney, Agent, or Firm* — Zilka-Kotab, P.C.

(57) ABSTRACT

A computer-implemented method, according to one approach, includes: causing a standby node having standby ports to be activated in response to detecting that ports of one or more host nodes are saturated. A list of preferred communication paths is updated to include communication paths that extend through the standby ports, and the updated list of preferred communication paths is sent to a host. Input/output (I/O) requests are further received from the host along the communication paths that extend through the standby ports. However, in response to detecting that the saturated ports have been cleared, the standby node is deactivated, and I/O requests are received from the host along communication paths extending through the cleared ports of the host nodes.

20 Claims, 6 Drawing Sheets

(56) References Cited

U.S. PATENT DOCUMENTS

| | | | |
|---|---|---|---|
| 2006/0045007 A1* | 3/2006 | Huck | H04J 3/14 |
| | | | 370/226 |
| 2008/0162732 A1* | 7/2008 | Ballew | H04Q 3/54558 |
| | | | 709/252 |
| 2008/0244174 A1* | 10/2008 | Abouelwafa | G06F 3/065 |
| | | | 711/114 |
| 2008/0250178 A1* | 10/2008 | Haustein | H04L 67/1097 |
| | | | 710/316 |
| 2009/0094370 A1* | 4/2009 | Jacob | H04L 61/2575 |
| | | | 709/228 |
| 2010/0098407 A1* | 4/2010 | Goswami | H04B 10/272 |
| | | | 398/1 |
| 2012/0047393 A1* | 2/2012 | Budnik | G06F 11/2035 |
| | | | 714/E11.078 |
| 2013/0155846 A1* | 6/2013 | Ramachandran | H04L 12/4641 |
| | | | 370/242 |
| 2013/0185731 A1* | 7/2013 | Barsness | G06F 9/3885 |
| | | | 718/105 |
| 2017/0315884 A1 | 11/2017 | Walls | |
| 2018/0052745 A1* | 2/2018 | Marripudi | G06F 11/2028 |
| 2018/0165169 A1 | 6/2018 | Camp et al. | |
| 2020/0081797 A1 | 3/2020 | Ainscow et al. | |
| 2020/0187192 A1* | 6/2020 | Yang | H04L 5/001 |
| 2020/0250040 A1 | 8/2020 | Vankamamidi et al. | |
| 2021/0279137 A1 | 9/2021 | Patel et al. | |
| 2022/0137824 A1* | 5/2022 | Nuthakki | G06F 3/0619 |
| | | | 711/154 |

* cited by examiner

100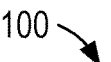

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

IMPROVED PORT SATURATION DETECTION CODE

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

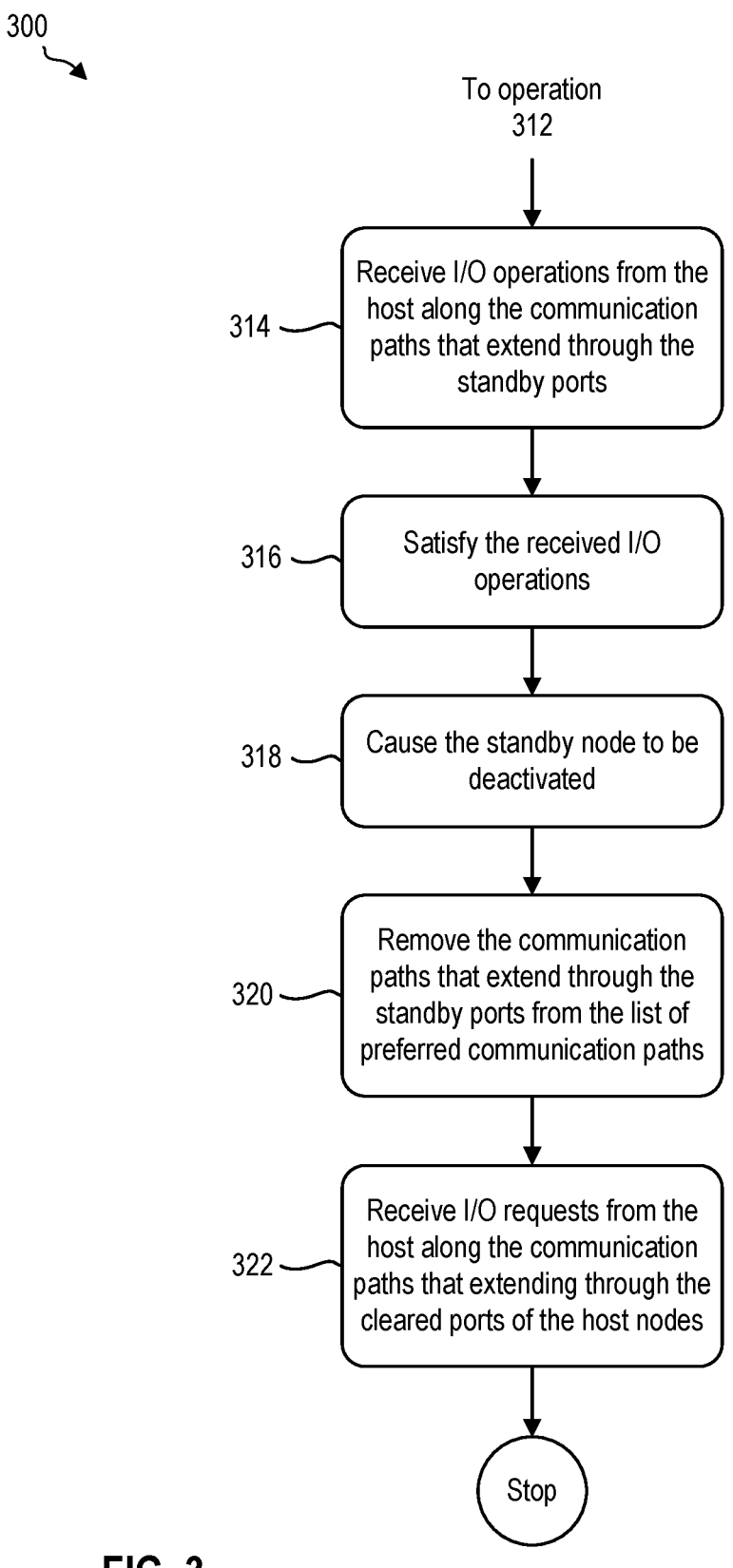

300

To operation
312

314 — Receive I/O operations from the host along the communication paths that extend through the standby ports 316 — Satisfy the received I/O operations 318 — Cause the standby node to be deactivated 320 — Remove the communication paths that extend through the standby ports from the list of preferred communication paths 322 — Receive I/O requests from the host along the communication paths that extending through the cleared ports of the host nodes Stop FIG. 3
(Continued)

OVERCOMING SATURATED PORTS IN DISTRIBUTED DATA STORAGE SYSTEMS

BACKGROUND

The present invention relates to data storage systems, and more specifically, this invention relates to overcoming saturated ports in distributed data storage systems.

Data production has continued to increase over time. For instance, the rise of smart enterprise endpoints has led to large amounts of data being generated at remote locations. Data production will further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

Cloud computing has been implemented to improve the processing and storage of an increasing amount of data. This has caused the network infrastructure used to transfer data to cloud computing locations to become increasingly important to data processing. Any network downtime thereby has a significant impact on the performance of the system. For example, host communication ports experiencing an unsustainable I/O rate may become saturated, causing throughput of the system as a whole to grind to a halt.

SUMMARY

A computer-implemented method (CIM), according to one approach, includes: causing a standby node having standby ports to be activated in response to detecting that ports of one or more host nodes are saturated. A list of preferred communication paths is updated to include communication paths that extend through the standby ports, and the updated list of preferred communication paths is sent to a host. Input/output (I/O) requests are further received from the host along the communication paths that extend through the standby ports. However, in response to detecting that the saturated ports have been cleared, the standby node is deactivated, and I/O requests are received from the host along communication paths extending through the cleared ports of the host nodes.

A computer program product (CPP), according to another approach, includes: a set of one or more computer-readable storage media, and program instructions that are collectively stored in the set of one or more storage media. Moreover, the program instructions are for causing a processor set to perform the foregoing CIM.

A computer system (CS), according to yet another approach, includes: a processor set, and a set of one or more computer-readable storage media. The CS further includes program instructions that are collectively stored in the set of one or more storage media, for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2A:
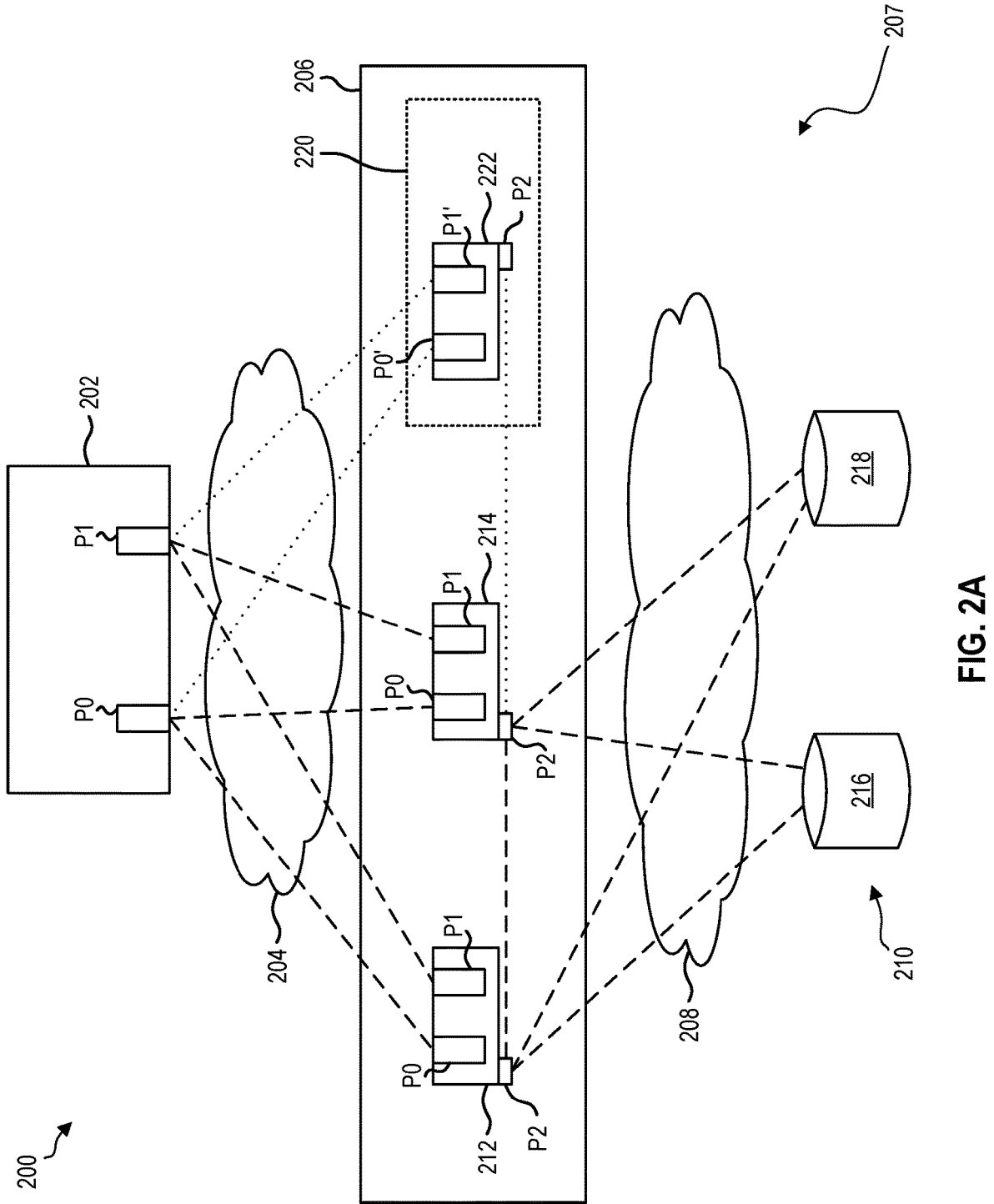
FIG. 2A is a representational view of a distributed system in a first configuration, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for detecting port saturation on host nodes in a cluster and selectively activating a standby node having standby ports that provide additional bandwidth while the standby node is active. Moreover, the standby node is deactivated in response to detecting the ports of the host nodes are no longer saturated. Approaches herein are thereby able to circumvent I/O saturation events and periods of low throughput in real-time without impacting performance, e.g., as will be described in further detail below.

In one general approach, a CIM includes: causing a standby node having standby ports to be activated in response to detecting that ports of one or more host nodes are saturated. A list of preferred communication paths is updated to include communication paths that extend through the standby ports, and the updated list of preferred communication paths is sent to a host. I/O requests are further received from the host along the communication paths that extend through the standby ports. However, in response to detecting that the saturated ports have been cleared, the standby node is deactivated, and I/O requests are received from the host along communication paths extending through the cleared ports of the host nodes.

In another general approach, a CPP includes: a set of one or more computer-readable storage media, and program instructions that are collectively stored in the set of one or more storage media. Moreover, the program instructions are for causing a processor set to perform the foregoing CIM.

In yet another general approach, a CS includes: a processor set, and a set of one or more computer-readable storage media. The CS further includes program instructions that are collectively stored in the set of one or more storage media, for causing the processor set to perform the foregoing CIM.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved port saturation detection code at block 150 for detecting port saturation on host nodes in a cluster and selectively activating a standby node having standby ports that provide additional bandwidth while the standby node is active. Moreover, the standby node is deactivated in response to detecting the ports of the host nodes are no longer saturated. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115.

Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, data production has continued to increase over time. For instance, the rise of smart enterprise endpoints has led to large amounts of data being generated at remote locations. Data production will further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

Cloud computing has been implemented to improve the processing and storage of an increasing amount of data. This has caused the network infrastructure used to transfer data to cloud computing locations to become increasingly important to data processing. Any network downtime thereby has a significant impact on the performance of the system. For example, host communication ports experiencing an unsustainable I/O rate may become saturated, causing throughput of the system as a whole to grind to a halt.

In sharp contrast to the reduced performance and other shortcomings that have been experienced by conventional products, approaches herein are able to circumvent I/O saturation events in real-time without impacting performance. Approaches herein are thereby able to overcome throughput-based issues that have plagued conventional systems, e.g., as will be described in further detail below.

Figure 2B:
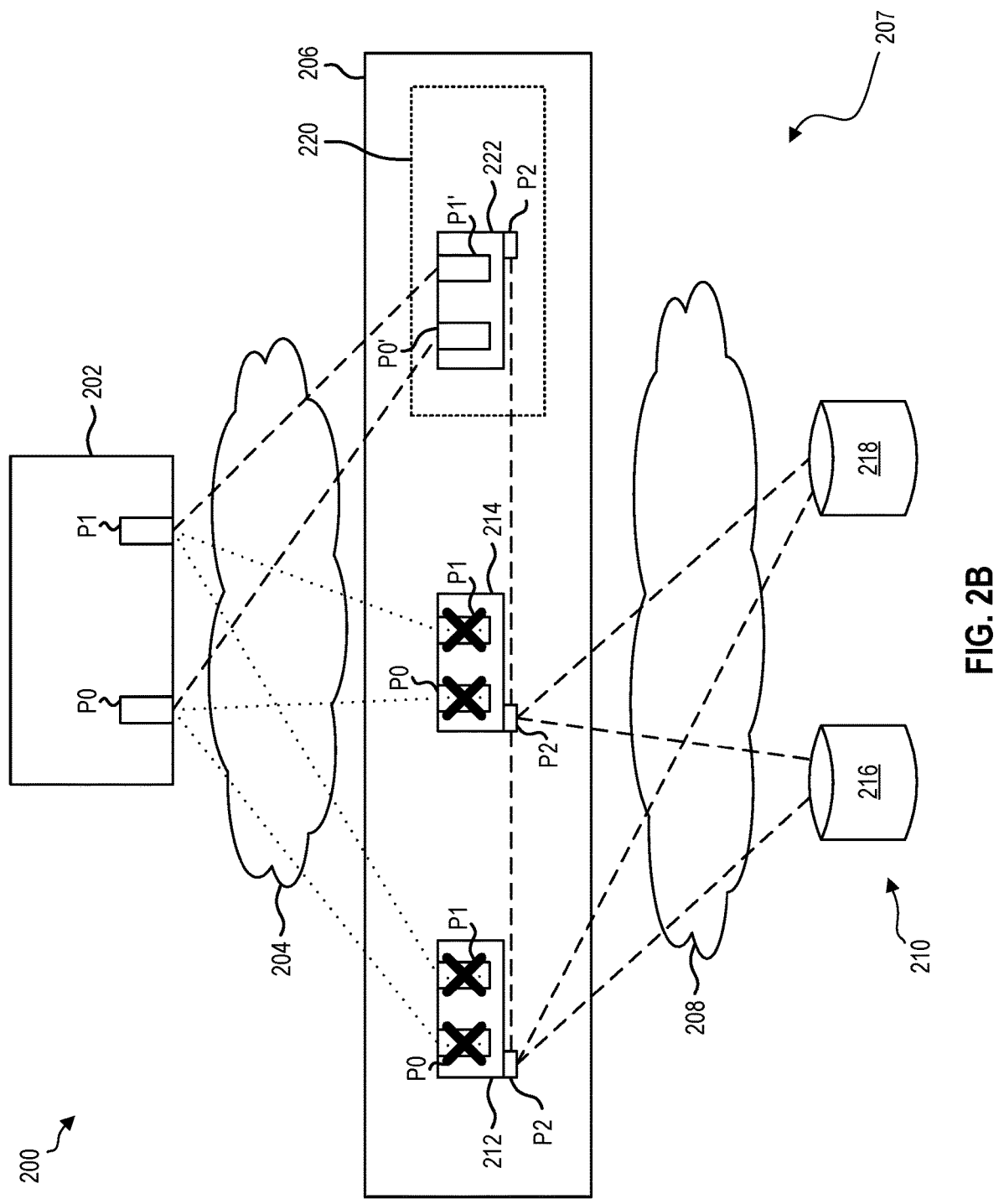
FIG. 2B is a representational view of the distributed system of FIG. 2A, in a second configuration, in accordance with one approach.
Figure 2C:
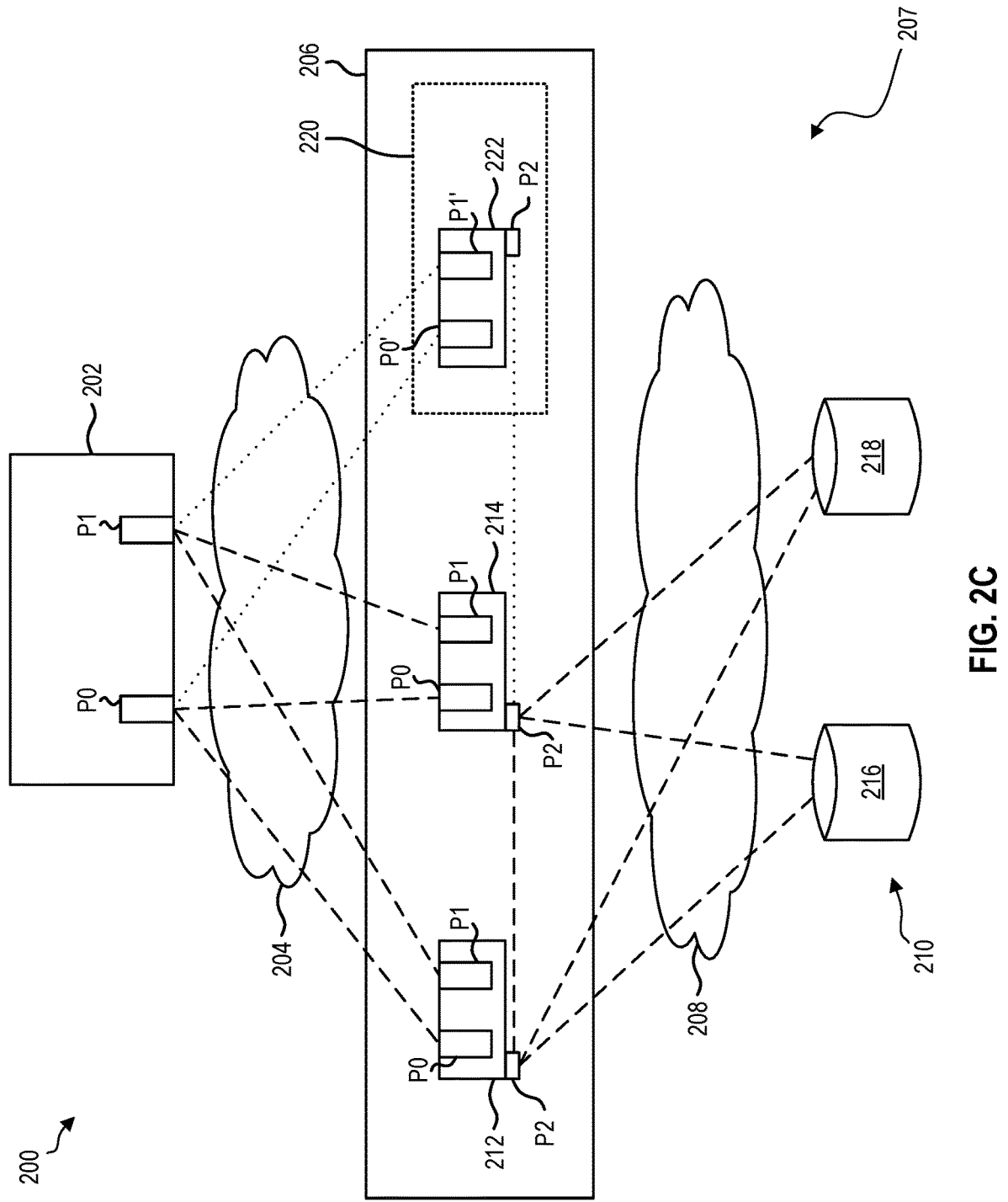
FIG. 2C is a representational view of the distributed system of FIG. 2A, returned to the first configuration, in accordance with one approach.

Looking now to FIGS. 2A-2C, a distributed system 200 is depicted in several different configurations according to different phases of operation. As an option, the present system 200 may be implemented in conjunction with features from any other embodiment listed herein, such as those described with reference to the other FIGS., such as FIG. 1. However, such system 200 and others presented herein may be used in various applications and/or in permutations which may or may not be specifically described in the illustrative embodiments listed herein. Further, the system 200 presented herein may be used in any desired environment. Thus FIGS. 2A-2C (and the other FIGS.) may be deemed to include any possible permutation.

Looking first to FIG. 2A, the distributed system 200 is shown as including a host location 202 that is in communication with a clustered layer 206 of a data storage cluster 207 over network 204. The clustered layer 206 is also in communication with a remote storage array 210 over network 208 of data storage cluster 207. The host location 202, clustered layer 206, and storage array 210 may each thereby be positioned in different geographical locations. However, in some approaches the clustered layer 206 may be positioned at the storage array 210 (e.g., a data storage location) and connected to the host location 202 over network 204. It follows that the components illustrated in FIGS. 2A-2C may be organized, configured, positioned, etc., differently depending on the approach.

The networks 204, 208 are preferably SANs. However, host location 202 can be connected to external systems (e.g., the external "world") via a WAN or other type of network. However, it should be noted that approaches herein may be implemented differently. For instance, in some approaches network 204 and/or 208 may be part of a same (shared) network, e.g., such as the Internet, LANs, PSTNs, SANs, internal telephone networks, etc. It follows that communication between locations may be achieved using requests, commands, etc., other than small computer systems interface (SCSI) commands as described in various approaches herein. As a result, any desired information, data, commands, instructions, responses, requests, etc. may be sent between host location 202, clustered layer 206, and/or storage array 210, regardless of the amount of separation which exists therebetween, e.g., despite being positioned at different geographical locations.

As alluded to above, it should be noted that two or more of the host location 202, clustered layer 206, and storage array 210 may be connected differently in some approaches. According to an example, which is in no way intended to limit the invention, two servers may be located relatively close to each other and connected by a wired connection, e.g., a cable, a fiber-optic link, an Ethernet link, a wire, etc., or any other type of connection which would be apparent to one skilled in the art after reading the present description. It should also be noted that the term "host" is in no way intended to be limiting. For instance, while a host may be described as an individual in some implementations herein, a host may be an application, an organization, a preset process, etc. The use of "data" and "information" herein is in no way intended to be limiting either, and may include any desired type of details, e.g., depending on the type of operating system implemented at host location 202, on clustered layer 206, and/or at storage array 210.

For instance, in data center environments, a host may be connected to SAN storage controllers. This connectivity may be achieved using interconnect protocols like Internet small computer systems interface (iSCSI), fiber channel (FC), iSCSI Extensions for RDMA (iSER), etc. It follows that in order to access storage, a host discovers storage devices that are connected to them, and logs into the storage using an interconnect protocol, e.g., as mentioned above. Once logged into a target controller, the host is able to issue I/Os on the devices that are mapped to that host, as if they were locally present.

Host location 202 includes ports P0, P1, each of which are able to exchange information over connections (also referred to herein as "communication paths") that extend to ports P0, P1 of existing host nodes 212, 214 as shown. Each of ports P0, P1 at existing host nodes 212, 214 are also connected to P0, P1 at existing host nodes 212, 214 are also connected to logical unit numbers (LUNs) 216, 218 that may be physically located in memory components of the storage array 210 in some approaches, managed at a remote location over a network, etc. It follows that each of the nodes 212, 214 of the clustered layer 206 connect the host 202 to the LUNs 216, 218 in the storage array 210.

For instance, port P0 of node 212 is shown as connecting port P0 at the host location 202, to LUN 216, while P2 of node 212 is shown as connecting port P1 of host location 202 to LUN 218. It follows that storage controllers may be deployed as a clustered system having multiple nodes, where each node is capable of being a target. According to an example, redundant SCSI connections may extend through multiple nodes (typically 2). Thus, when one node goes offline the partner node is able to assume responsibility for servicing I/Os intended for the offline node.

Each of the nodes 212, 214 are shown as connecting both ports P0, P1 at the host location 202 to both of the LUNs 216, 218, it should be noted that the different connection paths may be used differently depending on the situation. For instance, port P0 at host location 202 is connected to LUN 216 through port P0 of node 212 as well as port P0 of node 214. While both paths may be configured to transfer information (e.g., data, I/O requests, operations, etc.) to LUN 216, in some approaches one of the paths is designated as a preferred communication path between port P0 of host location 202 and LUN 216, while the redundant path is reserved for backup. For example, the preferred path may extend through both P0 and P1 of node 212, while the backup communication path extends through P0 and P1 of node 214. In other words, LUN 216 is accessed via node 212 only in approaches where the communication path between host location 202 and LUN 216 running through node 212 is active optimized. Similarly, LUN 218 is accessed via node 214 only in approaches where the communication path between host location 202 and LUN 218 running through node 214 is active optimized.

The number of LUNs being accessed are preferably divided about evenly between the available nodes of the clustered layer 206. For example, in a situation involving 8 different LUNs, the odd numbered LUNs may be accessed using a first node, while even numbered LUNs are accessed using a second node. In other words, the odd numbered LUNs will have active optimized paths extending through the first node, while even numbered LUNs will have active optimized paths extending through the second node.

For approaches implementing SCSI based communication, the preferred path may be indicated as "active optimized," while the backup communication path is indicated as "active non-optimized." This allows for information to be exchanged between host location 202 and LUN 216 efficiently, in addition to providing a remedy for situations where the preferred communication path becomes unavailable. Similarly, port P1 at host location 202 is connected to LUN 218 through port P1 of node 212 as well as port P1 of node 214. Moreover, the preferred path extends through P1 of node 214, while the backup communication path extends through P1 of node 212.

While the communication paths extending through host nodes 212, 214 offer redundant options, the number of I/O requests that are received may cause all ports on host nodes 212, 214 to become saturated. With respect to the present description, a port that has become "saturated" is unable to process newly received I/O requests. In some approaches, I/O requests may be received at a higher rate than the ports of host nodes 212, 214 are able to process. This may result in ports P0, P1 of node 212 and ports P0, P1 of node 214 each having a backlog of unsatisfied I/O requests, thereby effectively halting throughput of the active components in the clustered layer 206. In other approaches, the ports P0, P1 of host nodes 212, 214 may experience errors causing them to go offline and halt system throughput, at least temporarily. In still other approaches, ports P0, P1 of host nodes 212, 214 may be selectively taken offline in response to receiving a request from the host, a predetermined condition being met, etc. It follows that the ports P0, P1 of host nodes 212, 214 may become saturated in a number of different situations.

However, the clustered layer 206 also includes a standby module 220 with a standby node 222 that is maintained as a backup. The standby node 222 is kept in a deactivated state while the host nodes 212, 214 are operating nominally and able to satisfy the incoming I/O requests as they are received. The communication paths extending through standby ports P0', P1' of the standby node 222 are thereby offline, as indicated by the dashed lines in FIG. 2A.

In situations where the ports of the host nodes 212, 214 become saturated (e.g., in response to I/O requests being received at a higher rate), the standby node 222 is preferably activated such that the standby ports P0', P1' may be used to receive I/O requests while the ports P1, P0 of the host nodes 212, 214 are recovering. For instance, looking now to FIG. 2B, the distributed system 200 is shown in a configuration where the ports P0, P1 in host nodes 212, 214 have become saturated and are thereby unable to receive and satisfy incoming I/O requests, as indicated. Thus, while the communication paths extending through the ports P0, P1 in host nodes 212, 214 still exist, they are unable to transfer any information.

Rather, by activating the standby node 222 and standby ports P0', P1', I/O requests received from host 202 can still be processed. This is achieved in preferred approaches by sending the host I/O requests directly to nodes 212, 214 from standby node 222. For instance, the internal ports P2 allow for data, requests, information (e.g., metadata), etc., to be sent directly between the nodes 212, 214, 222. Thus, while standby ports P0', P1' of standby node 222 actually received the host I/O requests, nodes 212, 214 interact with the backend LUNs 216, 218, e.g., as will be described in further detail below. However, in some approaches the standby ports P0', P1' of standby node 222 may actually interact with the backend LUNs 216, 218 directly to ensure that received host I/Os are satisfied. For example, node 212 and/or 214 may experience a failure event and the node(s) itself may be taken offline. The spare node 222 may thereby at least temporarily serve as a replacement node for a failed one of the existing nodes 212, 214.

It follows that the standby module 220 provides spare cluster resources which achieve additional bandwidth in situations where port saturation is experienced in the wider cluster. Moreover, by keeping the standby node 222 deactivated during nominal system operation, approaches herein are able to avoid the additional overhead associated with fully adding the standby node 222 to an I/O cluster, e.g., as would be appreciated by one skilled in the art after reading the present description.

Again, the standby node 222 is preferably able to redistribute at least some of the I/O requests received from host 202. For instance, each of the nodes 212, 214, 222 are shown as including an internal port P2 which allows the nodes 212, 214, 222 to communicate directly with each other. The standby node 222 is thereby able to redistribute I/O requests directly between the nodes 212, 214, 222 along the dashed lines extending between the internal ports P2 of the nodes 212, 214, 222, even in situations where the host ports of nodes 212, 214 are saturated. Directing I/O requests from the standby node 222 through the internal ports P2 to an active node thereby achieves higher performance and provides more bandwidth than would otherwise be available. It should also be noted that nodes 212, 214 are able to redistribute I/O requests directly therebetween in situations where the standby node 222 is not activated or in a standby state, e.g., as seen in FIGS. 2A and 2C.

As explained above, any network downtime has a significant impact on performance of a system. While conventional products have suffered significant performance limitations stemming from being unable to satisfy I/O requests as they are received, approaches herein are able to circumvent I/O saturation events in real-time without impacting performance. Approaches herein are thereby able to overcome throughput-based issues that have plagued conventional systems.

Looking now to FIG. 2C, the distributed system 200 is shown in a configuration where the ports P0, P1 of the host nodes 212, 214 have been cleared and standby node 222 has been returned to a standby mode. In other words, the standby node 222 is deactivated in response to a backlog of I/O requests being cleared from one or more of the ports P0, P1 in the host nodes 212, 214. With respect to the present description, "clearing" a saturated port typically involves satisfying a predetermined amount (e.g., percentage) of the I/O requests that have been backlogged. However, it should be noted that clearing a saturated port may involve rejecting, reassigning, delaying, resubmitting, etc., one or more of the backlogged I/O requests in some approaches. In yet other approaches, a saturated port may be considered cleared when the backlog of I/O requests has been processed and the rate of request throughput through the port meets or exceeds the rate of incoming requests.

Referring still to FIG. 2C, the communication paths that extend through ports P0, P1 of host nodes 212, 214 are thereby able to receive I/O requests and ensure they are satisfied. Moreover, standby node 222 has been deactivated, causing the communication paths that extend through standby ports P0', P1' to be taken back offline. It is preferred that the communication paths are equally divided between the host nodes 212, 214 such that I/O requests are delivered to LUNs 216, 218 most efficiently. According to one approach, communication paths extend through node 212 for LUN 216 and through node 214 for LUN 218. It follows that the preferred communication channels and backup channels may be reestablished as desired during the process of reactivating communication paths that extend through the ports P0, P1 of nodes 212, 214.

Figure 3:
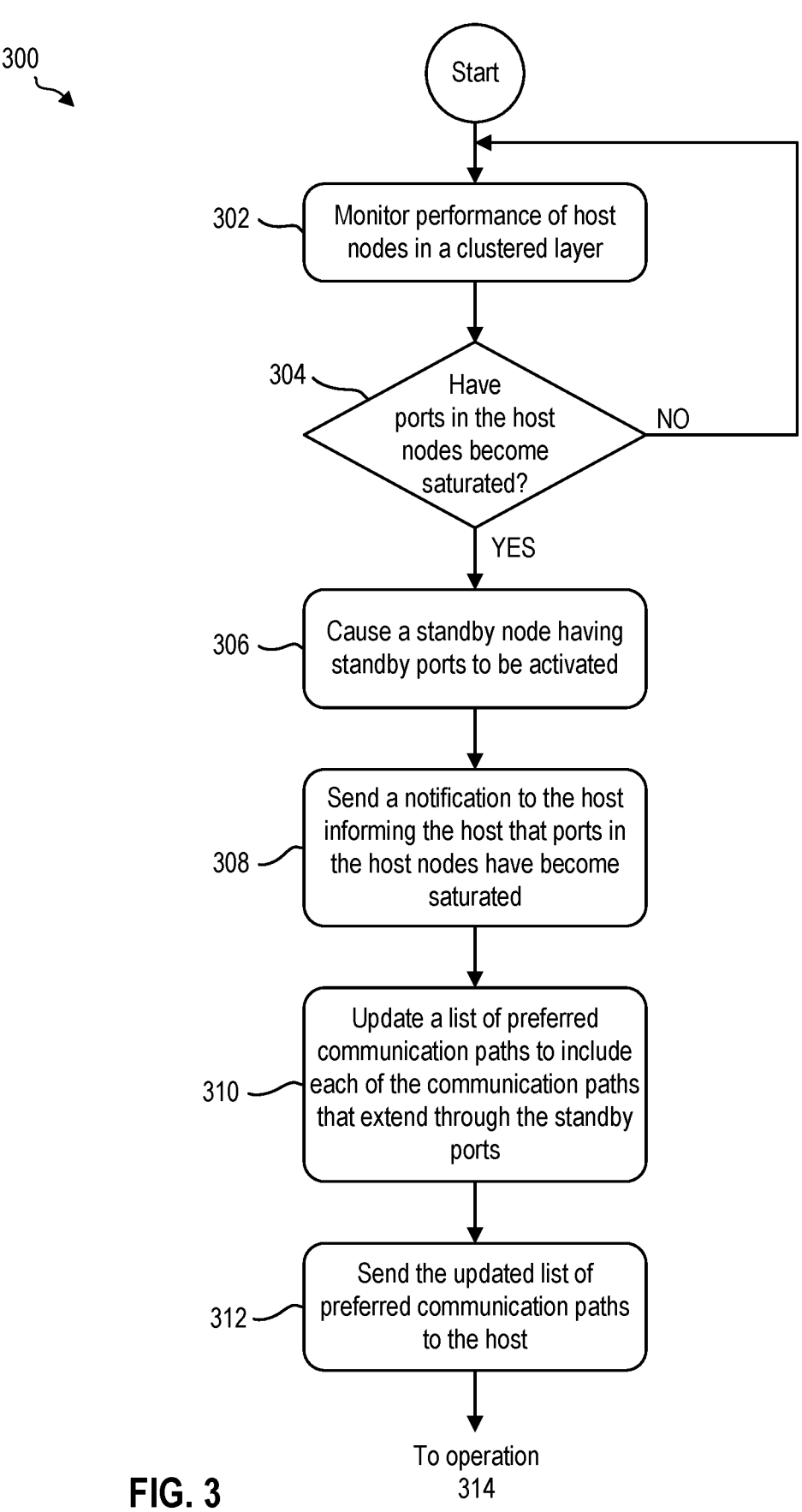
FIG. 3 is a flowchart of a method, in accordance with one approach.

Looking now to FIG. 3, a flowchart of a method 300 for detecting port saturation on host nodes in a cluster and selectively activating a standby node having standby ports that provide additional bandwidth while the standby node is active. Moreover, the method 300 is for deactivating the standby node in response to detecting the ports of the host nodes are no longer saturated, according to one approach. The method 300 may be performed in accordance with the present invention in any of the environments depicted in FIGS. 1-2C, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, any one or more of the operations in method 300 may be performed by a controller at a storage cluster (e.g., see data storage cluster 207 of FIGS. 2A-2C). In other embodiments, the method 300 may be partially or entirely performed by a controller, a processor, a computer, etc., or some other device having one or more processors therein. Thus, in some embodiments, method 300 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of method 300 includes monitoring performance of each host node in a clustered layer. Performance of a host node may be monitored by maintaining an accurate count of the number of I/O requests that have been received by ports in the host nodes, and which remain unsatisfied. It follows that in some approaches operation 302 includes monitoring the rates at which I/O requests are received at ports of the host nodes, and comparing the rates to real-time, projected, designed, etc. throughputs of the host nodes themselves. In other approaches, operation 302 may involve inspecting buffers used to accumulate I/O requests that are received by each of the ports in the respective host nodes. In still other approaches, a warning may be issued by each host node in response to a port therein becoming saturated. Thus, operation 302 may simply scan for warnings from any of the host nodes.

Proceeding to operation 304, a determination is made as to whether throughput of the cluster has decreased sufficiently far that corrective steps should be implemented. In other words, operation 304 includes determining whether ports in the host nodes have become saturated. In some approaches, the number of ports that are saturated may determine whether throughput of the cluster has decreased "sufficiently far," and dictate the outcome of operation 304. For instance, throughput of the cluster may be identified as having decreased sufficiently far that corrective steps should be implemented in response to determining that all ports of the host nodes have become saturated. In other approaches, throughput of the cluster may be identified as having decreased sufficiently far that corrective steps should be implemented in response to determining that one of the ports, a majority of the ports, specific one(s) of the ports, etc., in the host nodes have been saturated.

As noted above, a port may become saturated differently. In some approaches, I/O requests may be received at a higher rate than the ports are able to process, causing the ports to develop a backlog of unsatisfied I/O requests. In other approaches, the ports may experience errors causing them to go offline and halt system throughput. In still other approaches, ports may be intentionally (e.g., selectively) saturated and taken offline in response to receiving a request from the host, a predetermined condition being met, etc.

Operation 304 may thereby include determining whether the ports of the host nodes have a number of unsatisfied I/O requests that is outside a first range. The first range may be fixed (e.g., predetermined) by a user in some implementations, while in other implementations the range may be dynamically adjusted based on performance. For instance, network bandwidth experienced by the host nodes may be evaluated (e.g., sampled and inspected) continuously in the background. The first range may thereby be dynamically adjusted, at least in part, based on changes to the network bandwidth that are identified. For example, the first range may be expanded such that more I/O requests may be accumulated at each of the ports in situations where network bandwidth is high, and the first range may be reduced in situations where network bandwidth is low, such that fewer I/O requests may be accumulated at each of the ports.

Method 300 is shown as returning to operation 302 in response to determining that throughput of the cluster has not decreased sufficiently far that corrective steps should be implemented. Performance of the host nodes and corresponding ports may thereby continue to be monitored. However, in response to determining that throughput of the cluster has decreased sufficiently far that corrective steps should be implemented, method 300 advances from operation 304 to operation 306.

There, operation 306 includes causing a standby node having standby ports to be activated. In other words, one or more instructions that result in the standby node being activated may be sent to the standby node for implementation. As noted above, the standby node provides spare cluster resources which achieve additional bandwidth in situations where port saturation is experienced in the wider cluster. Moreover, by keeping the standby node deactivated during nominal system operation, approaches herein are able to avoid the additional overhead associated with fully adding the standby node to an I/O cluster.

Proceeding to operation 308, a notification is sent to the host informing the host that throughput of the cluster has decreased sufficiently far that the standby node and standby ports have been activated. In some approaches, the notification sent to the host is a unit attention command which informs the host that the standby node and standby ports have been activated. However, any desired type of notification may be sent to notify the host. Moreover, operation 310 includes updating a list of preferred communication paths to include each of the communication paths that extend through the now active standby ports. In other words, operation 310 includes updating the preferred communication path list to include communication paths that extend between the host and the storage location through the standby ports of the standby node activated in operation 306.

Updating the preferred communication path list allows the host (notified of the port saturation in operation 308) to send I/O requests along different communication paths that are available. This maintains system throughput even while ports in a clustered layer are saturated. Moreover, operation 312 includes sending the updated list of preferred communication paths to the host. In some approaches, the updated list of preferred communication paths may be sent to the host in response to receiving a request from the host to rescan active communication paths.

However, it should be noted that in some approaches, all available ports in a clustered layer may be presented to a host system. Thus, although the communication paths extending through the standby ports of the standby node may not be active, the host may be made aware that those communication paths exist. While aware of their existence, the host is not able to submit I/O requests along the standby communication paths while ports of the host nodes are operational.

With continued reference to FIG. 3, method 300 advances from operation 312 to operation 314. There, operation 314 includes receiving I/O operations from the host along the communication paths that extend through the standby ports. Operation 314 thereby includes receiving I/O requests along the communication paths made available by activating the standby node and standby ports (e.g., see communication paths extending through standby ports P0', P1' of standby node 222 of FIGS. 2A-2C).

Because all ports of the host nodes may be saturated in situations where the standby node and standby ports are activated from a standby mode (e.g., low power mode, limited functionality mode, etc.), incoming I/O requests may only be received along communication paths that extend through the standby ports. In other words, all I/O requests received from a host are received along the communication paths extending through the standby ports while the ports of the host nodes are saturated.

Operation 316 further includes satisfying the received I/O operations. In some approaches, the standby node satisfies all I/O requests that are received while the ports of the host nodes are saturated. However, in some situations it may be desirable that one or more of the received I/O requests are transferred (e.g., distributed) to the remaining host nodes in the clustered layer. In other words, while the ports of one or more host nodes may be saturated, the host nodes themselves may be able to cause I/O requests to be performed. For example, a host node may send one or more instructions to a LUN that cause one or more I/O requests to be satisfied, e.g., as would be appreciated by one skilled in the art after reading the present description.

It follows that in some approaches, operation 316 may include redistributing one or more of the I/O requests received by the standby ports of the standby node to the remaining host nodes. As noted above, each of the nodes may include an internal port which allows the nodes to communicate directly with each other. The standby node is thereby able to redistribute I/O requests between the remaining host nodes, even in situations where host ports are saturated. Directing I/O requests from the standby node through the internal ports to an active host node thereby achieves higher performance and provides more bandwidth than would otherwise be available.

The saturated ports identified in operation 304 are eventually cleared such that the corresponding host nodes are able to receive incoming I/O requests again. Accordingly, method 300 advances from operation 316 to operation 318 in response to detecting that the saturated ports have been cleared. There, operation 318 includes causing the standby node to be deactivated and return to a standby mode. In other words, the standby node is no longer used to satisfy received I/O requests now that ports of the remaining host nodes have been cleared.

Operation 320 further includes removing the communication paths that extend through the standby ports from the list of preferred communication paths in response to the standby node being deactivated. This ensures that the host is no longer able to send I/O requests along the communication paths that extend through the standby ports. Rather, the host utilizes the communication paths that extend through the recently cleared ports to deliver I/O requests. In preferred approaches, the original communication paths that extend through the cleared ports of the host nodes are recovered. In other words, the communication paths that were previously used to deliver I/O requests from the host to the host nodes are preferably reused. This desirably reduces resource consumption, but in other approaches, new (e.g., additional) communication paths may be established between the host and newly cleared ports of the host nodes.

As mentioned above, a notification may be sent to the host, informing the host that throughput of the cluster has been restored such that the standby node and standby ports are deactivated. In some approaches, the notification sent to the host is a unit attention command which informs the host that the standby node and standby ports have been deactivated. The unit attention command may also inform the host that ports of the host nodes are no longer saturated and available to receive I/O requests. However, any desired type of notification may be sent to the host to convey that the ports of the host nodes have been cleared and are available for use. Accordingly, operation 322 includes receiving I/O requests from the host along the communication paths that extending through the cleared ports of the host nodes.

It follows that approaches herein are desirably able to monitor and detect port saturation on host nodes in a cluster. In response to detecting port saturation, the system will activate the standby ports of one or more standby nodes so that bandwidth is expanded to satisfy incoming host I/O requests. Moreover, the standby node is deactivated in response to detecting the ports of the host nodes have been cleared (are no longer saturated), thereby allowing for system performance to be restored.

These improvements are applicable for iSCSI, FC, iSER, and any other protocol that works with the higher level SCSI protocol. Implementations herein thereby ensure that I/O processing is not disrupted even in situations where host nodes have saturated ports. Rather than relying on SCSI I/O timeouts to detect a connection issue on the host system, hosts will be notified much earlier and thereby can retry I/O requests on newly activated communication paths much faster than has been conventionally achievable.

According to an in-use example, which is in no way intended to be limiting, a storage system is able to monitor and detect port saturation on the active nodes in the cluster. In response to detecting port saturation on a port, the system activates the corresponding standby host ports on a standby node so that bandwidth is expanded for received I/O requests. The nodes experiencing the port saturation may raise a Unit Attention command for communication paths which are to be load balanced. The Unit Attention command informs the host to rescan the paths, and in return, the host may send a request (e.g., an ALUA™ request) to the Storage System. In response the cluster layer may provide a new set of preferred paths which includes the standby host ports of the standby node. In response to the standby host ports of the standby node receiving I/O requests, the network traffic may be forwarded over the clustering ports to the remaining host nodes of the I/O group. Moreover, in response to a cause of the port saturation being resolved, the node in the I/O group serving the I/O requests raises another Unit Attention command which returns the communication paths that extend through the standby nodes to a standby mode.

This allows for available host port bandwidth on an idle standby node to tide over situations where a host port bandwidth is saturated on the main cluster. In these circumstances, the system admin is preferably advised of the situation. This allows for system resources to be used during a period of saturation, whilst allowing the system admin to identify the root cause. Moreover, in situations where an actual failover is experienced, the system can utilize the standby node until the original system configuration can be restored, e.g., by raising another unit attention, responding to another ALUA request from the host, and recovering the original paths. It should also be noted that although some approaches herein are described in the context of ALUA requests in systems that implement the SCSI protocol to access storage, this is in no way intended to be limiting. In other approaches, equivalent results may be achieved by using asymmetric namespace access (ANA) for non-volatile memory express (NVMe) over Fabric protocols using similar and/or the same provisions as other approaches described herein, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), comprising:
in response to detecting that ports of one or more host nodes are saturated, causing a standby node having standby ports to be activated;
updating a list of preferred communication paths to include communication paths that extend through the standby ports;
sending the updated list of preferred communication paths to a host;
receiving input/output (I/O) requests from the host along the communication paths that extend through the standby ports;
in response to detecting that the saturated ports have been cleared, causing the standby node to be deactivated;
receiving I/O requests from the host along communication paths extending through the cleared ports of the host nodes; and
in response to the standby node being deactivated, removing the communication paths that extend through the standby ports from the list of preferred communication paths.

2. The CIM of claim 1, further comprising:
in response to receiving a request to rescan active communication paths, sending the updated list of preferred communication paths to the host.

3. The CIM of claim 1, wherein the host nodes and the standby node are at a data storage cluster, wherein the data storage cluster is in communication with the host over a network.

4. The CIM of claim 1, wherein detecting that the ports of the host nodes have been saturated includes:
determining whether the ports of the host nodes have a number of unsatisfied I/O requests that is outside a first range; and
in response to determining that the ports of the host nodes have a number of unsatisfied I/O requests that is outside the first range, informing the host that the ports of the host nodes are saturated by sending a Unit Attention command to the host.

5. The CIM of claim 4, further comprising:
evaluating network bandwidth experienced by the host nodes in real-time; and
dynamically adjusting the first range based at least in part on the network bandwidth.

6. The CIM of claim 1, wherein all I/O requests received from the host are received along the communication paths extending through the standby ports while the ports of the host nodes are saturated.

7. The CIM of claim 1, wherein the standby node and of the host nodes include respective internal ports, wherein the internal ports of the standby node and the host nodes are configured to communicate with each other directly.

8. The CIM of claim 1, wherein the receiving of the I/O requests from the host along communication paths extending through the cleared ports of the host nodes includes:
informing the host that the ports of the host nodes have been cleared by sending a Unit Attention command to the host; and
recovering the original communication paths that extend through the cleared ports of the host nodes.

9. A computer program product (CPP), comprising:
a set of one or more computer-readable storage media; and
program instructions, collectively stored in the set of one or more computer-readable storage media, for causing a processor set to perform the following computer operations:
in response to detecting that ports of one or more host nodes are saturated, cause a standby node having standby ports to be activated;
update a list of preferred communication paths to include communication paths that extend through the standby ports;
send the updated list of preferred communication paths to a host;
receive input/output (I/O) requests from the host along the communication paths that extend through the standby ports;
in response to detecting that the saturated ports have been cleared, cause the standby node to be deactivated;
receive I/O requests from the host along communication paths extending through the cleared ports of the host nodes; and
in response to the standby node being deactivated, remove the communication paths that extend through the standby ports from the list of preferred communication paths.

10. The CPP of claim 9, wherein the program instructions are for causing the processor set to further perform the following computer operations:
in response to receiving a request to rescan active communication paths, send the updated list of preferred communication paths to the host.

11. The CPP of claim 9, wherein the host nodes and the standby node are at a data storage cluster, wherein the data storage cluster is in communication with the host over a network.

12. The CPP of claim 9, wherein detecting that the ports of the host nodes have been saturated includes:
determining whether the ports of the host nodes have a number of unsatisfied I/O requests that is outside a first range; and
in response to determining that the ports of the host nodes have a number of unsatisfied I/O requests that is outside the first range, informing the host that the ports of the host nodes are saturated by sending a Unit Attention command to the host.

13. The CPP of claim 12, wherein the program instructions are for causing the processor set to further perform the following computer operations:

evaluate network bandwidth experienced by the host nodes in real-time; and dynamically adjust the first range based at least in part on the network bandwidth.

14. The CPP of claim 9, wherein all I/O requests received from the host are received along the communication paths extending through the standby ports while the ports of the host nodes are saturated.

15. The CPP of claim 9, wherein the standby node and the host nodes include respective internal ports, wherein the internal ports of the standby node and the host nodes are configured to communicate with each other directly.

16. The CPP of claim 9, wherein the receiving of the I/O requests from the host along communication paths extending through the cleared ports of the host nodes includes:

informing the host that the ports of the host nodes have been cleared by sending a Unit Attention command to the host; and recovering the original communication paths that extend through the cleared ports of the host nodes.

17. A computer system (CS), comprising:

a processor set;

a set of one or more computer-readable storage media;

program instructions, collectively stored in the set of one or more computer-readable storage media, for causing the processor set to perform the following computer operations:

in response to detecting that ports of one or more host nodes are saturated, cause a standby node having standby ports to be activated;

update a list of preferred communication paths to include communication paths that extend through the standby ports;

send the updated list of preferred communication paths to a host;

receive input/output (I/O) requests from the host along the communication paths that extend through the standby ports;

in response to detecting that the saturated ports have been cleared, cause the standby node to be deactivated;

receive I/O requests from the host along communication paths extending through the cleared ports of the host nodes; and in response to the standby node being deactivated, remove the communication paths that extend through the standby ports from the list of preferred communication paths.

18. The CS of claim 17, wherein the program instructions are for causing the processor set to further perform the following computer operations:

in response to receiving a request to rescan active communication paths, send the updated list of preferred communication paths to the host.

19. The CS of claim 17, wherein the host nodes and the standby node are at a data storage cluster, wherein the data storage cluster is in communication with the host over a network.

20. The CS of claim 17, wherein the receiving of the I/O requests from the host along communication paths extending through the cleared ports of the host nodes includes:

informing the host that the ports of the host nodes have been cleared; and recovering the original communication paths that extend through the cleared ports of the host nodes.

* * * * *